US012706458B2

(12) United States Patent
Wang et al.

(10) Patent No.: US 12,706,458 B2
(45) Date of Patent: Aug. 11, 2026

(54) EQUIVALENT AGGREGATION METHOD AND APPARATUS FOR ELECTRO-THERMAL COUPLED VIRTUAL POWER PLANT

(71) Applicants: TSINGHUA UNIVERSITY, Beijing (CN); STATE GRID JIBEI ELECTRIC POWER COMPANY, Beijing (CN); STATE GRID BEIJING ELECTRIC POWER COMPANY, Beijing (CN)

(72) Inventors: Bin Wang, Beijing (CN); Xuanyuan Wang, Beijing (CN); Haotian Zhao, Beijing (CN); Yanna Xi, Beijing (CN); Bo Ning, Beijing (CN); Hongbin Sun, Beijing (CN); Zhen Liu, Beijing (CN); Shu Wang, Beijing (CN); Qinglai Guo, Beijing (CN)

(73) Assignees: TSINGHUA UNIVERSITY, Beijing (CN); STATE GRID JIBEI ELECTRIC POWER COMPANY, Beijing (CN); STATE GRID BEIJING ELECTRIC POWER COMPANY, Beijing (CN)

( * ) Notice: Subject to any disclaimer, the term of this patent is extended or adjusted under 35 U.S.C. 154(b) by 364 days.

(21) Appl. No.: 18/457,674

(22) Filed: Aug. 29, 2023

(65) Prior Publication Data

US 2024/0213771 A1 Jun. 27, 2024

(30) Foreign Application Priority Data

Dec. 23, 2022 (CN) ........................ 202211660208.7

(51) Int. Cl.
*H02J 3/00* (2026.01)
*H02J 103/30* (2026.01)

(52) U.S. Cl.
CPC ............ *H02J 3/00* (2013.01); *H02J 2103/30* (2026.01)

(58) Field of Classification Search
CPC ......... H02J 3/381; G06Q 50/06; G06Q 10/04; Y04S 10/50; Y04S 10/52; G06F 2119/06; G06F 17/11; G06F 2113/04; G05B 13/026
See application file for complete search history.

(56) References Cited

U.S. PATENT DOCUMENTS

2020/0118053 A1* 4/2020 Chapin ............ G06Q 10/06315
2021/0294946 A1* 9/2021 Hendriks ............... G16H 50/20

FOREIGN PATENT DOCUMENTS

CN 110061524 7/2019
CN 111313400 6/2020
(Continued)

OTHER PUBLICATIONS

CNIPA, First Office Action for CN Application No. 202211660208.7, Dec. 27, 2025.

*Primary Examiner* — Darrin D Dunn
(74) *Attorney, Agent, or Firm* — Hodgson Russ LLP

(57) ABSTRACT

The present disclosure provides an equivalent aggregation method and an apparatus for an electro-thermal coupled virtual power plant. The method includes: obtaining an equivalence model in a heating section of the electro-thermal coupled virtual power plant by training a support vector machine; establishing a computing model for equivalent aggregation of the electro-thermal coupled virtual power plant; and realizing the equivalent aggregation of the electro-thermal coupled virtual power plant by solving the computing model for the equivalent aggregation of the electro-thermal coupled virtual power plant.

13 Claims, 2 Drawing Sheets

(56) References Cited

FOREIGN PATENT DOCUMENTS

| | | | | | |
|---|---|---|---|---|---|
| CN | 111313400 A | * | 6/2020 | ................ | H02J 3/00 |
| CN | 110061524 B | * | 10/2020 | ................ | H02J 3/48 |
| CN | 112072645 | | 12/2020 | | |
| CN | 113324283 | | 8/2021 | | |
| CN | 111179110 B | * | 9/2023 | ............. | G06Q 50/06 |

* cited by examiner

EQUIVALENT AGGREGATION METHOD AND APPARATUS FOR ELECTRO-THERMAL COUPLED VIRTUAL POWER PLANT

CROSS-REFERENCE TO RELATED APPLICATIONS

This application claims priority to Chinese Patent Application No. 202211660208.7, filed Dec. 23, 2022, the entire disclosure of which is incorporated herein by reference.

TECHNICAL FIELD

The present disclosure belongs to a field of operation control technology of integrated energy systems, and relates to an equivalent aggregation method for an electro-thermal coupled virtual power plant and an equivalent aggregation apparatus for an electro-thermal coupled virtual power plant.

BACKGROUND

In order to achieve a goal of low carbon, there is a need to construct a new power system with new energy as a main body. In the new power system, a penetration rate of new energy power generation will increase significantly, and its randomness and volatility bring great challenges to the safe and economic operation of the power system. As an important form of effective management of distributed energy access to the superior power grid, the virtual power plant aggregates a large number of distributed energy sources, controllable loads and energy storage devices into a virtual whole, to participate in the operation and scheduling of the power grid, thereby improving the safe and economic operation of the power grid, and reducing the investment costs of the power grid at the same time.

Currently, with the development of the urban centralized heating system, the electric-thermal coupling has become more and more compact, and in order to give full play to the flexibility of electric-thermal synergy, the electric-thermal coupling resources are integrated into an electric-thermal coupling virtual power plant to respond to the scheduling of the power system. The multi-energy virtual power plant equivalent aggregation technology is the basis for participation in the scheduling of the power market and the power system. However, due to the complexity of the heat transfer process in the heating section and the difficulty of accurate modeling, the purely model-driven equivalent approach may bring large errors.

The existing Chinese Patent Application No. 201911094785.2, titled "a Robust Correction-Based Method for Aggregating Operation Parameters of a Multi-Energy Virtual Power Plant", uses a model-driven approach to perform equivalent calculation for the electric-thermal coupled virtual power plant, but this approach assumes that the heating section model parameters are known and completely accurate. However, in practice, the parameters of the heating pipe network due to differences in operating conditions, corrosion of the inner wall of the pipe section and other reasons, may be of great difference from theoretical calculation values. The use of inaccurate parameters will make the aggregation model obtained by this method less accurate and may produce power deviations of interconnection lines that do not satisfy the aggregation assessment requirements of the virtual power plant.

SUMMARY

According to a first aspect of the present disclosure, an equivalent aggregation method for an electro-thermal coupled virtual power plant is provided. The method includes:

obtaining an equivalence model in a heating section of the electro-thermal coupled virtual power plant by training a support vector machine;

establishing a computing model for equivalent aggregation of the electro-thermal coupled virtual power plant; and realizing the equivalent aggregation of the electro-thermal coupled virtual power plant by solving the computing model for the equivalent aggregation of the electro-thermal coupled virtual power plant.

According to a second aspect of the present disclosure, an equivalent aggregation apparatus for an electro-thermal coupled virtual power plant is provided. The apparatus includes: an equivalence model generating element, configured to obtain an equivalence model in a heating section of the electro-thermal coupled virtual power plant by training a support vector machine;

a computing model establishing element, configured to establish a computing model for equivalent aggregation of the electro-thermal coupled virtual power plant; and a computing model solving element, configured to realize equivalent aggregation of the electro-thermal coupled virtual power plant by solving the computing model for equivalent aggregation of the electro-thermal coupled virtual power plant.

According to a third aspect of the present disclosure, an electronic device is provided. The electronic device includes:

a memory, configured to store instructions executable by a computer;

a processor, configured to sequentially execute following operations:

obtaining an equivalence model in a heating section of the electro-thermal coupled virtual power plant by training a support vector machine;

establishing a computing model for equivalent aggregation of the electro-thermal coupled virtual power plant; and realizing equivalent aggregation of the electro-thermal coupled virtual power plant by solving the computing model for equivalent aggregation of the electro-thermal coupled virtual power plant.

According to a fourth aspect of the present disclosure, a non-volatile computer-readable storage medium having computer programs stored thereon is provided. The computer programs are configured to cause a computer to sequentially execute:

obtaining an equivalence model in a heating section of the electro-thermal coupled virtual power plant by training a support vector machine;

establishing a computing model for equivalent aggregation of the electro-thermal coupled virtual power plant; and realizing equivalent aggregation of the electro-thermal coupled virtual power plant by solving the computing model for equivalent aggregation of the electro-thermal coupled virtual power plant.

Additional aspects and advantages of the embodiments of the present disclosure will be given in part in the following descriptions, become apparent from the following descriptions, or be learned from the practice of the embodiments of the present disclosure.

BRIEF DESCRIPTION OF THE DRAWINGS

In order to more clearly illustrate the technical solutions in the embodiments of the present disclosure, the following is a brief description of the accompanying drawings to be used in the description of the embodiments. Obviously, the accompanying drawings in the following description are only some embodiments of the present disclosure, and other accompanying drawings can be obtained by those skilled in the art according to the accompanying drawings without inventive works.

DETAILED DESCRIPTION

The technical solutions in embodiments of the present disclosure will be clearly and completely described below in combination with the accompanying drawings in the embodiments of the present disclosure. Obviously, the described embodiments are a part of the embodiments of the present disclosure, and not all of them. Based on the embodiments of the present disclosure, all other embodiments obtained without inventive works by those skilled in the art fall within the scope of protection of the present disclosure.

The following is a detailed description of the present disclosure in combination with the accompanying drawings of the present disclosure.

The present disclosure provides an equivalent aggregation method for an electro-thermal coupled virtual power plant, an equivalent aggregation apparatus for an electro-thermal coupled virtual power plant, an electronic device and a storage medium, which overcome the shortcomings of the existing model driving methods to obtain the parameters precisely and make the aggregation results more accurate.

Figure 1:
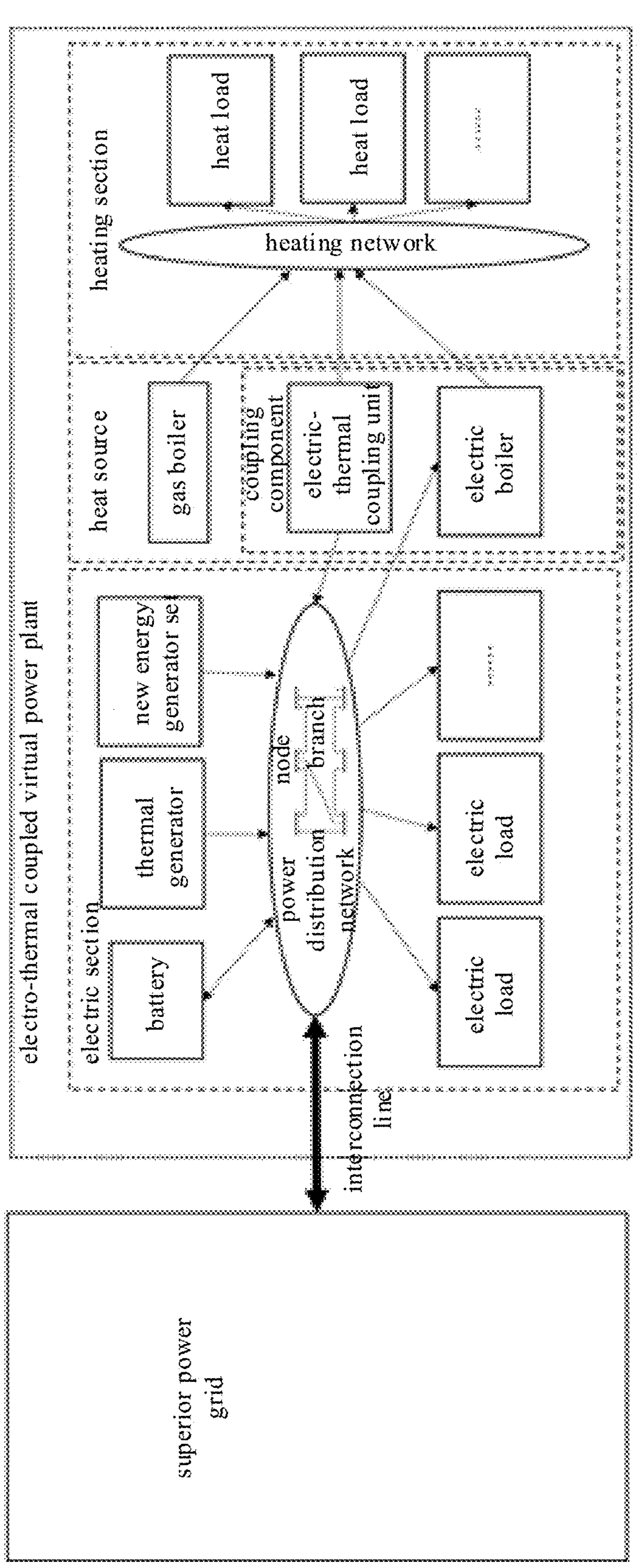
FIG. 1 is a schematic diagram of a relation between an electro-thermal coupled virtual power plant and a superior power grid according to an embodiment of the present disclosure.

FIG. 1 is a schematic diagram of a relation between an electro-thermal coupled virtual power plant and a superior power grid according to an embodiment of the present disclosure.

In a method embodiment of the present disclosure, an equivalent aggregation method for an electro-thermal coupled virtual power plant is provided. The method includes the following steps.

In step I, an equivalence model in a heating section of the electro-thermal coupled virtual power plant is obtained by training the support vector machine. The step includes the following steps.

Based on historical operation data of the heating section of the electro-thermal coupled virtual power plant or using a heating section simulation model built by using a simulation model, N pieces of operation data of the equivalence model for training the heating section of the electro-thermal coupled virtual power plant are obtained, a data set $X=\{X_1, X_2, \ldots, X_N\}$, i.e., $\{X_{i_d}|1 \le i_d \le N\}$, $$X_1, X_2, \ldots, X_N$$

is established, and heating powers and outdoor temperatures of all heat sources in the heating section at all times are selected from the operation data set $$X$$

and are determined as features, in which a subscript id represents an operation data serial number, id=1, 2, . . . , N, $$X_{i_d} = \left[h_{i_d,t}^1, h_{i_d,t}^2, \ldots, h_{i_d,t}^{NHS}, \tau_{i_d,t}\right]^T,$$

$t \in T$, a superscript T represents a matrix transposition, and NHS represents a total number of heat sources in the heating section of the electro-thermal coupled virtual power plant. In embodiments of the present disclosure, there are three types of heat sources, i.e., combined heat and power components, electric boilers and gas boilers, in which $$h_{i_d,t}^j$$

represents a thermal output power of a jth heat source in the heating section in the idth operation data at a scheduling time t, and $$\tau_{i_d,t}$$

represents an outdoor temperature in the idth operation data at the scheduling time t.

(2) A test set is obtained from historical operation data or by the simulation model, and the test set is used for training the equivalence model in the heating section of the electro-thermal coupled virtual power plant, in which the test set is used to test an accuracy rate of the equivalence model in the heating section of the electro-thermal coupled virtual power plant based on the historical operation data of the heating section of the electro-thermal coupled virtual power plant or using the simulation model of the heating section built using the simulation model. NTE pieces of operation data are obtained, which are generally different from the above-mentioned N operation data in step (1). For different operation data, different dates is selected, and for simulation data, different results can be obtained by using different simulation conditions. A test data set $$X_{TE} = \left\{X_1^{TE}, X_2^{TE}, \ldots, X_{N_{TE}}^{TE}\right\}$$

is established by using the NTE operation data as test data, and heating powers and outdoor temperatures of all heat sources in the heating section at all times are determined from the test data set $X_{TE}$ as features.

(3) Initial labels $$y^0 = \left[y_1, y_2, \ldots, y_{i_d} \ldots, y_N\right]^T$$

are assigned to each data in the operation data set X in step (1), in which the subscript id represents the operation data serial number, id=1, 2, . . . , N, $$y_{i_d}$$

represents a label corresponding to the idth operation data, and the superscript T represents the matrix transposition. A temperature inside all heat load chambers in the heating section of the electro-thermal coupled virtual power plant under conditions of the operation data set is judged. In case that the temperature inside all the heat load chambers reaches a temperature threshold under operation conditions corresponding to the idth operation data $$X_{i_d},$$

label 0 is assigned to the idth operation data by $$y_{i_d}=0,$$

and in case that the temperature inside at least one heat load chamber in the electro-thermal coupled virtual power plant does not reach the temperature threshold, label 1 is assigned to the idth operation data by $$y_{i_d}=1.$$

(4) Labels $$y_{TE}=\left[y_1, y_2, \ldots, y_{i_{TE}} \ldots, y_N\right]^T$$

are assigned to the test data set generated in step (2), in which a subscript TE represents a test data serial number, $i_{TE}$=1, 2, . . . , $N_{TE}$, and a superscript T represents the matrix transposition, and a temperature inside heat load chambers in the heating section under operation conditions of the test data set is judged. In case that the temperature inside all the heat load chambers reaches the temperature threshold under operation conditions corresponding to the $i_{TE}$th test data, label 0 is assigned to the $i_{TE}$th test data, and in case that the temperature inside at least one heat load chamber in the electro-thermal coupled virtual power plant does not reach the temperature threshold, label 1 is assigned to the $i_{TE}$th test data.

An equivalence model accuracy threshold $$\varepsilon_D$$

and a maximum training number nmax are set, and single classification training is performed on the operation data set $$X$$

in step (1), which includes the following process.

A total training number is set as n=1, the operation data set $$X$$

is input into a support vector machine $$SVM_1.$$

Classification results for each data in the operation data set $$X$$

are output by the support vector machine $$SVM_1$$

to obtain a classification model $$SVM_1=(w_1, b_1),$$

where $$w_1$$

represents a hyper-plane normal vector of the classification model in the support vector machine, and $$b_1$$

represents a hyper-plane intercept of the classification model in the support vector machine. The support vector machine is a class of generalized linear classifiers that perform binary classification of data in a supervised learning fashion, with a decision boundary of a maximum margin hyperplane solved for learned samples, the SVMs were proposed in the 1964 at a paper Vapnik, V. and Chervonenkis, A., A note on class of perceptron on the Automation and Remote Control, 24, and subsequently developed rapidly after the 1990s and derived a series of improved and extended algorithms).

(6) The test data set $$X_{TE}=\left\{X_1^{TE}, X_2^{TE}, \ldots, X_{N_{TE}}^{TE}\right\}$$

generated in step (2) and the labels $$y_{TE}=\left[y_1, y_2, \ldots, y_{i_{TE}} \ldots, y_N\right]^T$$

assigned in step (4) are used to calculate a classification accuracy rate $$\varepsilon_R$$

of the support vector machine $$SVM_1 = (w_1, b_1)$$

when n=1 by a following formula:

$$\varepsilon_R = \frac{N_{correct}}{N_{total}} \times 100\%,$$

where $$N_{total}$$

is a total number of data points in the test data set $$X_{TE}$$

whose labels are 1, $$N_{correct}$$

is a number of samples correctly classified, and $$N_{correct}$$

is a total number of data points in the test data set $$X_{TE}$$

whose labels are 1 and classified as category 1 by the classification model $$SVM_1.$$

(7) Comparing the $$\varepsilon_R$$

with the equivalence model accuracy threshold $$\varepsilon_D,$$

in case that $$\varepsilon_R < \varepsilon_D$$

and n<nmax, step (8) is executed, and in case that $$\varepsilon_R \geq \varepsilon_D$$

or n≥nmax, a support vector machine SVMn is used as the equivalence model in the heating section of the electro-thermal coupled virtual power plant, and step (2) is executed.

(8) The n in step (5) is added by 1 and labels $$y^n = \{y_1^n, y_2^n, \ldots, y_N^n\}$$

are reassigned to the operation data set $$X$$

in step (1), where $$y_{i_d}^n = \begin{cases} y_{i_d}^{n-1}, & i_d \notin S_{wrong} \\ \max\{y_{i_d}^{n-1}\} + 1, & i_d \in S_{wrong} \end{cases},$$

$$S_{wrong}$$

represents a set consisting of serial numbers of the samples classified incorrectly in step (6), and $$S_{wrong} = \{i \mid y_i^0 = 1, SVM_n(X_i) < 1\},$$

id represents the data serial number of the operation data set.

(9) The operation data set $$X$$

in step (1) and the labels $$y^n$$

in step (8) are classified, to obtain an (n+1)th classification model $$SVM_{n+1} = \left(w_1^{n+1}, b_1^{n+1}, \ldots, w_{(n+1)(n+2)/2}^{n+1}, b_{(n+1)(n+2)/2}^{n+1}\right),$$

where $$w_i^{n+1}, b_i^{n+1}$$

represent an ith hyper-plane normal vector and an ith hyper-plane intercept in the (n+1)th classification model, respectively.

(10) For the (n+1)th classification model $$SVM_{n+1},$$

an accuracy rate of the (n+1)th classification model $$SVM_{n+1}$$

is tested by using the test data set $$X_{TE} = \{X_1^{TE}, X_2^{TE}, \dots, X_{N_{TE}}^{TE}\}$$

generated in step (2) and the labels $$y_{TE} = [y_1, y_2, \dots, y_{i_{TE}} \dots, y_N]^T$$

assigned in step (4), and a classification accuracy rate $$\varepsilon_R$$

of the (n+1)th classification model $$SVM_{n+1}$$

is calculated by using the method in step (6), where $$N_{total}$$

represents a total number of data points whose labels are 1 in $$X_{TE}, N_{correct}$$

represents a total number of data points in the test data set $$X_{TE}$$

whose labels are 1 and classified as category 1 by the classification model $$SVM_1,$$

and when $$SVM_{n+1}(X_i) > 0$$

and $$y_i^0 = 1,$$

the data point i is considered to be accurately classified.

(11) It is configured that n=n+1, comparing $$\varepsilon_R$$

in step (10) with the equivalence model accuracy threshold $$\varepsilon_D,$$

in case that $$\varepsilon_R < \varepsilon_D$$

and n<nmax, it is returned to step (8), and in case that $$\varepsilon_R \geq \varepsilon_D$$

or n≥nmax, using the support vector machine SVMn as the equivalence model in the heating section of the electro-thermal coupled virtual power plant, and it is returned to step (2).

In step II, the computing model for equivalent aggregation of the electro-thermal coupled virtual power plant is established, which includes the following steps.

(21) an objective function of the computing model for equivalent aggregation of the electro-thermal coupled virtual power plant is established:

$$\min_y \sum_{t\in\Upsilon}\left(c_t^{p,min}\underline{p}_t - c_t^{p,max}\overline{p}_t + c_t^{e,min}\underline{e}_t - c_t^{e,max}\overline{e}_t - c_t^{ru}r_t^u - c_t^{rd}r_t^d\right) + \max_{p_t^{order}\in\Omega}\ \min_x \sum_{t\in\Upsilon}[\sigma(\delta_t^+ + \delta_t^-)],$$

where the objective function is a maximum feasible domain of the computing model of equivalent aggregation of the electro-thermal coupled virtual power plant obtained by aggregation; parameters $$\underline{p}_t, \overline{p}_t, \underline{e}_t, \overline{e}_t, r_t^d \text{ and } r_t^u$$

represent a lower power limit, an upper power limit, a lower energy limit, an upper energy limit, a lower limit of a power change rate, and an upper limit of the power change rate of an interconnection line between the electro-thermal coupled virtual power plant and a superior power grid at the scheduling time t, respectively;

$$c_t^{p,min}, c_t^{p,max}, c_t^{e,min}, c_t^{e,max}, c_t^{ru} \text{ and } c_t^{rd}$$

represent weights of the parameters $$\underline{p}_t, \overline{p}_t, \underline{e}_t, \overline{e}_t, r_t^d \text{ and } r_t^u,$$

respectively; values of $$c_t^{p,min}, c_t^{p,max}, c_t^{e,min}, c_t^{e,max}, c_t^{ru} \text{ and } c_t^{rd}$$

are determined according to actual operation conditions of the superior power grid. In an embodiment of the present disclosure, since the power system may require a higher upper power limit for the electro-thermal coupled virtual power plant, $$c_t^{p,max}$$

is taken to be a larger value of 20, $$c_t^{p,min}, c_t^{e,min}, c_t^{e,max}, c_t^{ru} \text{ and } c_t^{rd}$$

are taken to be 10 respectively, and $$p_t^{order}$$

is an active power order is an active power value of a possible scheduling plan of the superior power grid at the scheduling time t and is a variable to be solved.

$$\{\underline{p}_t, \overline{p}_t, \underline{e}_t, \overline{e}_t, r^u, r^d\}$$

represent variables to be calculated for solving an aggregation model of the electro-thermal coupled virtual power plant, these six variables constitute the feasible domain obtained by aggregation and $$p_t^{order}$$

satisfies that $$\underline{p}_t \le p_t^{order} \le \overline{p}_t, t \in T,$$

$$\underline{e}_t \le \sum_{t=1}^{t} p_t^{order} \le \overline{e}_t, t \in T,$$

and $$-r^d \le p_t^{order} - p_{t-1}^{order} \le r^u, t \in T$$

where $$\sigma$$

represents a large positive number, such as 106, $$\delta_t^+$$

represents an auxiliary variable for a power positive deviation of the interconnection line, $$\delta_t^-$$

represents an auxiliary variable for a power negative deviation of the interconnection line, $$y$$

represents a first stage decision variable for an optimal computing model for equivalent aggregation of the electro-thermal coupled virtual power plant, and $$x$$

represents a second stage decision variable for the optimal computing model. A column vector consisting of the first stage decision variables $$y$$

is $$y = [\underline{p}_t, \overline{p}_t, \underline{e}_t, \overline{e}_t, r^u, r^d],$$

and a column vector consisting of the second stage decision variables $$x$$

is $$x = \left[p^{i_G}, p^{i_W}, p_t^{CHP,i_C}, h_t^{CHP,i_C} p_t^{c,i_E}, p_t^{dc,i_E}, e_t^{i_E}, h_t^{i_{GB}}, p_t^{i_{EB}}, \delta_t^+, \delta_t^-\right],$$

where $$p_t^{i_G}$$

represents a power output of an iGth thermal generator in an electric section of the electro-thermal coupled virtual power plant at the scheduling time t, $$p_t^{W,i_W}$$

represents an actual power output of an iWth new energy generator set in the electric section of the electro-thermal coupled virtual power plant at the scheduling time t, $$p_t^{CHP,i_C}$$

and $$h_t^{CHP,i_C}$$

represent an electricity output and a heat output of an iCth combined heat and power component in a coupling section of the electro-thermal coupled virtual power plant at the scheduling time t, respectively.

$$p_t^{c,t_E}$$

and $$p_t^{dc,i_E}$$

represent a charging power and a discharging power of an iEth battery in the electric section of the electro-thermal coupled virtual power plant at the scheduling time t, respectively.

$$e_t^{i_E}$$

represents an energy stored by the iEth battery in the electric section of the electro-thermal coupled virtual power plant at the scheduling time t;

$$h_t^{i_{GB}}$$

represents a heating power of an iGBth gas boiler in the heating section of the electro-thermal coupled virtual power plant at the scheduling time t.

$$p_t^{i_{EB}}$$

represents a power consumption of an iEBth electric boiler in the heating section of the electro-thermal coupled virtual power plant at the scheduling time t; and in the objective function, except for $$\delta_t^+, \delta_t^-,$$

the weights of other variables in the objective function are 0.

(22) Constraints of the optimal computing model for equivalent aggregation of the electro-thermal coupled virtual power plant are established, which includes the following steps.

(221) The constrains of the electric section are:

$$p_t^{tie} + \sum_{i_G \in S_G} p_t^{i_G} + \sum_{i_W \in S_W} p_t^{i_W} + \sum_{i_C \in S_{CHP}} p_t^{i_C} + \sum_{i_E \in S_{ES}} \left(p_t^{dc,i_E} - p_t^{c,i_E}\right) = \sum_{i_B \in S_{BUS}} P_t^{L,i_B} + \sum_{i_{EB} \in S_{EB}} p_t^{i_{EB}}, \forall t \in \Upsilon$$

$$p_t^{l,BR} = \left|\sum_{n \in S_{BUS}} PTDF_{l,i_B} \cdot p_t^{NET,i_B}\right|, \forall l \in S_{BR}, t \in \Upsilon$$

$$p_t^{NET,n} = \sum_{i_G \in S_{G,i_B}} p_t^{i_G} + \sum_{i_W \in S_{W,i_B}} p_t^{i_W} + \sum_{i_C \in S_{CHP,i_B}} p_t^{i_C} + \sum_{i_E \in S_{ES,i_B}} \left(p_t^{dc,i_E} - p_t^{c,i_E}\right) - P_t^{L,n} - \sum_{i_{EB} \in S_{EB,n}} p_t^{i_{EB}}$$

$$e_1^{i_E} = E_0^{i_E} + \left(\eta^{c,i_E} p_1^{c,i_E} - p_1^{dc,i_E} / \eta^{dc,i_E}\right)\Delta t, \forall i_E \in S_{ES},$$

$$e_t^{i_E} = \left(1 - s^{i_E}\right)e_{t-1}^{i_E} + \left(\eta^{c,i_E} p_t^{c,i_E} - \frac{p_t^{dc,i_E}}{\eta^{dc,i_E}}\right)\Delta t, \forall t \in \Upsilon \backslash \{1\}, \forall i \in S_{ES}.$$

$$0 \le p_t^{i_W} \le P_t^{i_W,pre}$$

$$P_{min}^{i_G} \le p_t^{i_G} \le P_{max}^{i_G}$$

$$P_{min}^{i_{EB}} \le p_t^{i_{EB}} \le P_{max}^{i_{EB}}$$

where $$S_G, S_W, S_{CHP}, S_{ES}, S_L \text{ and } S_{EB}$$

represent a collection of thermal generators, a collection of new energy generator sets, a collection of combined heat and power components, a collection of batteries, a collection of electric loads, and a collection of electric boilers in the electro-thermal coupled virtual power plant, respectively; a subscript iB of device collection represents a collection of all devices connected to a node iB of a power distribution network in the electric section of the electro-thermal coupled virtual power plant;

$$S_{G,i_B}$$

represents a collection of all thermal generators located at the node iB; $S_{BUS}$ and $S_{BR}$ represent a collection of all nodes and a collection of all branches of the power distribution network in the electric section of the electro-thermal coupled virtual power plant, respectively;

$$S_{ES}$$

represents a collection of all batteries in the electric section of the electro-thermal coupled virtual power plant;

$$P_t^{L,i_B}$$

represents an electric load power at the node iB at the scheduling time t;

$$PTDF_{l,i_B}$$

represents a power transmission distribution factor of the node iB to a distribution network branch l, which is calculated by a direct current power flow equation in a power system network analysis technique;

$$p_t^{l,BR}$$

represents a power of the distribution network branch l in the electric section of the electro-thermal coupled virtual power plant at the scheduling time t;

$$p_t^{NET,i_B}$$

represents a net outflow power of the node iB of the power distribution network in the electric section of the electro-thermal coupled virtual power plant at the scheduling time t;

$$\eta^{c,i_E}$$

and $$\eta^{dc,i_E}$$

represent a charging efficiency and a discharging efficiency of the iEth battery in the electric section of the electro-thermal coupled virtual power plant, respectively, the values of $$\eta^{c,i_E}$$

and $$\eta^{dc,i_E}$$

depend on the factory specification of the battery. In an embodiment of the present disclosure, the values of $$\eta^{c,i_E}$$

and $$\eta^{dc,i_E}$$

are 0.95 and 0.95 respectively.

$$\Delta t$$

represents an interval of scheduling times;

$$s^{i_E}$$

represents a self-loss rate of the iEth battery in the electric section of the electro-thermal coupled virtual power plant, the value depends on the factory specification of the battery, in an embodiment of the present disclosure, the value is 0.999.

$$P_t^{i_W,pre}$$

represents a prediction power of the iWth new energy generator set in the electric section of the electro-thermal coupled virtual power plant at the scheduling time t;

$$P_{max}^{i_G}$$

and $$P_{min}^{i_G}$$

represents a maximum active power and a minimum active power of the iGth thermal generator in the electric section of the electro-thermal coupled virtual power plant, respectively, which can be obtained from the device specification; and $$P_{max}^{i_{EB}}$$

and $$P_{min}^{i_{EB}}$$

represent a maximum active power and a minimum active power of the iEBth electric boiler in a coupling element of the electro-thermal coupled virtual power plant, respectively, which can be obtained from the device specification.

(222) The constrains of the coupling element are:

$$h_t^{i_{EB}} = \eta^{i_{EB}} p_t^{i_{EB}}, \forall\, i_{EB} \in S_{EB}$$

$$0 \le \lambda_t^{i_C,k} \le 1, \forall\, k \in EP^{i_C}, \forall\, t \in \Upsilon, \forall\, i_C \in S_{CHP}$$

$$\sum_{k \in EP^i} \lambda_t^{i_C,k} = 1, \forall\, t \in \Upsilon, \forall\, i_C \in S_{CHP}$$

$$p_t^{i_C} = \sum_{k \in EP^i C} \lambda_t^{i_C,k} P^{i_C,k},\ h_t^{i_C} = \sum_{k \in EP^i C} \lambda_t^{i_C,k} H^{i_C,k}, \forall\, t \in \Upsilon, \forall\, i_C \in S_{CHP}$$

$$H_{min}^{i_{GB}} \le h_t^{i_{GB}} \le H_{max}^{i_{GB}}$$

where $$\eta^{i_{EB}}$$

represents an efficiency of the iEBth electric boiler in the coupling element of the electro-thermal coupled virtual power plant;

$$h_t^{i_{EB}}$$

represents a thermal output power of the iEBth electric boiler at the scheduling time t;

$$EP^{i_C}$$

represents a collection of all poles of the feasible domain of the iCth combined heat and power component;

$$\lambda_t^{i_C,k}$$

represents a scale factor of a pole k of the iCth combined heat and power component;

$$P^{i_C,k}$$

and $$H^{i_C,k}$$

represent an electrical power and a thermal power corresponding to the pole k of the iCth combined heat and power component, respectively. For back-pressure combined heat and power components, the number of poles in the feasible domain is usually 2, the feasible domain is a straight line, and the electro-thermal ratio is usually fixed. For pumped condensing combined heat and power components, the number of poles in the feasible domain is 3 or 4 because the pumping volume can be adjusted $$H_{max}^{i_{GB}}$$

and $$H_{min}^{i_{GB}}$$

represent a maximum thermal power and a minimum thermal power of the iGBth gas boiler, respectively, which can be obtained from the device specification.

(223) The constraints of the heating section after data-driven equivalence are obtained by the following processes.

The equivalence model in the heating section of the electro-thermal coupled virtual power plant obtained in step (1) is determined as the constraints of the heating section after data-driven equivalence by $$SVM_n(h_t^1, h_t^2, \ldots, h_t^{NHS}, \tau_t) = 0$$

where a superscript NHS represents a total number of heat sources in the heating section of the electro-thermal coupled virtual power plant;

$$h_{i_d,t}^j$$

represents a thermal output power of a jth heat source in the heating section in an idth data at the scheduling time t, and $$\tau_{i_d,t}$$

represents the outdoor temperature in the idth data at the scheduling time t.

In step III, equivalent aggregation of the electro-thermal coupled virtual power plant is realized by solving the computing model for equivalent aggregation of the electro-thermal coupled virtual power plant, which includes: obtaining optimal values of $$\underline{p}_t, \overline{p}_t, \underline{e}_t, \overline{e}_t, r^d \text{ and } r^u$$

by solving the optimal computing model constitute of the objective function and the constraints in step II for equivalent aggregation of the electro-thermal coupled virtual power plant by a column-and-constraint generation process, and determining optimal values of $$\underline{p}_t, \overline{p}_t, \underline{e}_t, \overline{e}_t, r^d \text{ and } r^u$$

as final values of a lower power limit, an upper power limit, a lower energy limit, an upper energy limit, a lower limit of power change rate, and an upper limit of power change rate of an interconnection line between the electro-thermal coupled virtual power plant and a superior power grid. The column-constraint generation method used in this step, a common technique for solving robust optimization problems, was first proposed in the 2013 in the paper "Solving two-stage robust optimization problems using a column-and-constraint generation method".

The present disclosure provides the equivalent aggregation method for the electro-thermal coupled virtual power plant, it firstly obtains the linear equivalent constraints of the heating section by a data driving process, and then adds the linear equivalent constraints of the heating section to the aggregation model of the electro-thermal coupled virtual power plant, to obtain the equivalent aggregation model for the electro-thermal coupled virtual power plant driven by model and data. Compared with the existing patent application No. 201911094785.2, the method of the present disclosure firstly obtains the linear equivalent constraints of the heating section in step I by the data driving process, and then adds the linear equivalent constraints of the heating section into the aggregation model of the electro-thermal coupled virtual power plant to obtain the equivalent aggregation model of the virtual power plant in step II, and finally realizes the equivalent aggregation for the electro-thermal coupled virtual power plant driven by model and data. Therefore, the method of the present disclosure overcomes the disadvantage of inaccurate aggregation results caused by the difficulty of obtaining parameters accurately in the model driving method in the related art.

Compared with the existing technology, the equivalent aggregation method for the electro-thermal coupled virtual power plant of the present disclosure uses a data-model driving process to perform equivalent aggregation for the electro-thermal coupled virtual power plant, which organically combines the reliability of the model driving algorithm and the adaptiveness of the data driving algorithm, so as to overcome the problem of inaccurate heating section model in the electro-thermal coupled virtual power plant and achieve more accurate equivalent aggregation.

Figure 2:
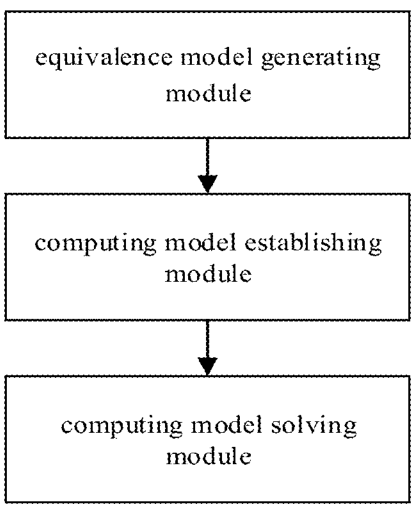
FIG. 2 is a schematic diagram of an equivalent aggregation apparatus for an electro-thermal coupled virtual power plant according to an embodiment of the present disclosure.

Corresponding to the equivalent aggregation method for the electro-thermal coupled virtual power plant, an embodiment of the present disclosure provides an equivalent aggregation apparatus for the electro-thermal coupled virtual power plant. The structure of the apparatus is shown in FIG. 2, and the apparatus includes:

- an equivalence model generating module configured to obtain an equivalence model in a heating section of the electro-thermal coupled virtual power plant by training a support vector machine;
- a computing model establishing module configured to establish a computing model for equivalent aggregation of the electro-thermal coupled virtual power plant; and
- a computing model solving module configured to realize equivalent aggregation of the electro-thermal coupled virtual power plant by solving the computing model for equivalent aggregation of the electro-thermal coupled virtual power plant.

An embodiment of the present disclosure provides an electronic device. The electronic device includes:

- a memory configured to store instructions executable by a computer;
- a processor configured to, in sequence:
  - obtain an equivalence model in a heating section of the electro-thermal coupled virtual power plant by training a support vector machine;
  - establish a computing model for equivalent aggregation of the electro-thermal coupled virtual power plant; and
  - realize equivalent aggregation of the electro-thermal coupled virtual power plant by solving the computing model for equivalent aggregation of the electro-thermal coupled virtual power plant.

An embodiment of the present disclosure provides a non-volatile computer-readable storage medium having computer programs stored thereon. The computer programs are configured to cause a computer to:

- obtain an equivalence model in a heating section of the electro-thermal coupled virtual power plant by training a support vector machine;
- establish a computing model for equivalent aggregation of the electro-thermal coupled virtual power plant; and
- realize equivalent aggregation of the electro-thermal coupled virtual power plant by solving the computing model for equivalent aggregation of the electro-thermal coupled virtual power plant.

It should be noted that in embodiments of the present disclosure, the processor referred to may be a central processing unit (CPU), a general purpose processor, a digital signal processor (DSP), an application specific integrated circuit (ASIC), a field programmable gate array (FPGA) or other programmable logic devices, discrete gates or transistor logic devices, discrete hardware components, etc. The general purpose processor may be a microprocessor, or any conventional processor, etc. The memory may be used to store the computer programs and/or modules, and the processor performs various functions of equivalent aggregation of the electro-thermally coupled virtual power plant by running or executing the computer programs and/or modules stored in the memory, and by calling data stored in the memory. The memory may primarily include a storage program area and a storage data area. The storage program area may store an operating system, at least one application required for the function (e.g., sound playback function, image play back function, etc.), etc. The storage data area may store data created by the operating system in the course of running the application, etc. In addition, the memory may include a high-speed random access memory, and a non-volatile memory, such as hard disk, memory, plug-in hard disk, smart media card (SMC), secure digital (SD) card, flash card, at least one disk memory device or flash memory device.

Based on such understanding, the present disclosure implements all or part of the processes in the method of the above embodiments, which may also be accomplished by means of computer programs to instruct the relevant hardware. The computer programs may be stored in a computer readable storage medium. When the computer programs are executed by a processor, the steps of each of the above method embodiments are implemented. The computer programs include computer program codes in the form of source codes, object codes, executable files or some intermediate form, etc. The computer readable medium may include: any entity or device capable of carrying the computer program codes, a recording medium, a USB flash drive, a mobile hard disk, a diskette, a CD, a computer memory, a read only memory (ROM), a random access memory (RAM), an electric carrier signal, a telecommunication signal and a software distribution medium, etc. It is noted that the above described embodiments of the device are merely schematic, wherein the units described as separate components illustrated may or may not be physically separated, and the components displayed as units may or may not be physical units, i.e., they may be located in one place or may be distributed to a plurality of network units. Some or all of these modules can be selected according to practical needs to achieve the purpose of the solution of the embodiment. In addition, the connection relation between the modules in the attached drawings of the device embodiments provided in the present disclosure indicates that they are communicatively connected with each other, which can be specifically implemented by one or more communication buses or signal lines, and understood and implemented by those skilled in the art without inventive works.

The above described are preferred embodiments of the present disclosure, and it should be noted that for those skilled in the art, a number of improvements and embellishments can be made without departing from the principles of the present disclosure, which are also considered to be within the scope of protection of the present disclosure.

What is claimed is:

1. An equivalent aggregation method for an electro-thermal coupled virtual power plant, comprising:

obtaining an equivalence model in a heating section of the electro-thermal coupled virtual power plant by training a support vector machine;

establishing a computing model for equivalent aggregation of the electro-thermal coupled virtual power plant; and realizing the equivalent aggregation of the electro-thermal coupled virtual power plant by solving the computing model for the equivalent aggregation of the electro-thermal coupled virtual power plant;

wherein obtaining the equivalence model in the heating section of the electro-thermal coupled virtual power plant by training the support vector machine comprises:

(1) based on historical operation data of the heating section of the electro-thermal coupled virtual power plant or using a heating section simulation model built using a simulation model, obtaining N operation data, establishing an operation data set $X=\{X_1, X_2, \ldots, X_N\}$, wherein $\{X_{i_d}|1\leq i_d\leq N\}$, $X_1, X_2, \ldots, X_N$, determining heating powers and outdoor temperatures of all heat sources in the heating section at all times from the operation data set X as features, wherein a subscript $i_d$ represents an operation data serial number, $$i_d = 1, 2, \ldots, N,\ X_{i_d} = \left[h^1_{i_d,t}, h^2_{i_d,t}, \ldots, h^{NHS}_{i_d,t}, \tau_{i_d,t}\right]^T, t \in T,$$

a superscript T represents a matrix transposition, NHS represents a total number of heat sources in the heating section of the electro-thermal coupled virtual power plant, $$h^j_{i_d,t}$$

represents a thermal output power of a $j^{th}$ heat source in the heating section in the $i_d^{th}$ operation data at a scheduling time t, $\tau_{i_d,t}$ represents an outdoor temperature in the $i_d^{th}$ operation data at the scheduling time t;

(2) obtaining NTE operation data from the historical operation data of the heating section of the electro-thermal coupled virtual power plant or the heating section simulation model built using the simulation model, establishing a test data set $$X_{TE} = \{X^{TE}_1, X^{TE}_2, \ldots, X^{TE}_{N_{TE}}\}$$

by using the $N_{TE}$ operation data as test data, determining heating powers and outdoor temperatures of all heat sources in the heating section at all times from the test data set $X_{TE}$ as features;

(3) assigning initial labels $y^0=[y_1, y_2, \ldots, y_{i_d} \ldots, y_N]^T$ to each data in the operation data set X in step (1), wherein the subscript $i_d$ represents the operation data serial number, $i_d=1, 2, \ldots, N$, $y_{i_d}$ represents a label corresponding to the $i_d^{th}$ operation data, and the superscript T represents the matrix transposition; judging a temperature inside all heat load chambers in the heating section of the electro-thermal coupled virtual power plant under conditions of the operation data set, in case that the temperature inside all the heat load chambers reaches a temperature threshold under operation conditions corresponding to the $i_d^{th}$ operation data $X_{i_d}$, assigning label 0 to the $i_d^{th}$ operation data by $y_{i_d}=0$, and in case that the temperature inside at least one heat load chamber in the electro-thermal coupled virtual power plant does not reach the temperature threshold, assigning label 1 to the $i_d^{th}$ operation data by $y_{i_d}=1$;

(4) assigning labels $y_{TE}=[y_1, y_2, \ldots, y_{i_{TE}} \ldots, y_N]^T$ to the test data set generated in step (2), wherein a subscript TE represents a test data serial number, $i_{TE}=1, 2, \ldots, N_{TE}$, and a superscript T represents the matrix transposition; and judging a temperature inside heat load chambers in the heating section under operation conditions of the test data set, in case that the temperature inside all the heat load chambers reaches the temperature threshold under operation conditions corresponding to the $i_{TE}^{th}$ test data, assigning label 0 to the $i_{TE}^{th}$ test data, and in case that the temperature inside at least one heat load chamber in the electro-thermal coupled virtual power plant does not reach the temperature threshold, assigning label 1 to the $i_{TE}^{th}$ test data;

(5) setting an equivalence model accuracy threshold $\varepsilon_D$ and a maximum training number $n_{max}$, and performing single classification training on the operation data set X in step (1) comprising:

setting a total training number n=1, inputting the operation data set X to the support vector machine $SVM_1$, outputting classification results for each data in the operation data set X by the support vector machine $SVM_1$, and obtaining a classification model $SVM_1=(w_1, b_1)$, where $w_1$ represents a hyper-plane normal vector of the classification model in the support vector machine, and $b_1$ represents a hyper-plane intercept of the classification model in the support vector machine;

(6) using the test data set $$X_{TE} = \{X^{TE}_1, X^{TE}_2, \ldots, X^{TE}_{N_{TE}}\}$$

generated in step (2) and the labels $y_{TE}=[y_1, y_2, \ldots, y_{i_{TE}} \ldots, y_N]^T$ assigned in step (4), calculating a classification accuracy rate $\varepsilon_R$ of the support vector machine $SVM_1=(w_1, b_1)$ when n=1 by a following formula:

$$\varepsilon_R = \frac{N_{correct}}{N_{total}} \times 100\%,$$

where $N_{total}$ is a total number of data points in the test data set $X_{TE}$ whose labels are 1, $N_{correct}$ is a number of samples correctly classified, and $N_{correct}$ is a total number of data points in the test data set $X_{TE}$ whose labels are 1 and classified as category 1 by the classification model $SVM_1$;

(7) comparing the $\varepsilon_E$ with the equivalence model accuracy threshold $\varepsilon_D$, in case that $\varepsilon_R<\varepsilon_D$ and $n<n_{max}$, executing step (8), and in case that $\varepsilon_R\geq\varepsilon_D$ or $n\geq n_{max}$, using a support vector machine $SVM_n$ as the equivalence model in the heating section of the electro-thermal coupled virtual power plant, and executing step (2);

(8) adding the n in step (5) by 1 and reassign labels $$y^n = \{y_1^n, y_2^n, \ldots, y_N^n\}$$

the operation data set X in step (1), where $$y_{i_d}^n = \begin{cases} y_{i_d}^{n-1}, & i_d \notin S_{wrong} \\ \max\{y_{i_d}^{n-1}\} + 1, & i_d \in S_{wrong} \end{cases},$$

$S_{wrong}$ represents a set consisting of serial numbers of the samples classified incorrectly in step (6), $$S_{wrong} = \{i \mid y_1^0 = 1, SVM_n(X_i) < 1\},$$

represents the data serial number of wrong the operation data set;

(9) classifying the operation data set X in step (1) and the labels $y^n$ in step (8), to obtain an $(n+1)^{th}$ classification model $$SVM_{n+1} = \left(w_1^{n+1}, b_1^{n+1}, \ldots, w_{(n+1)(n+2)/2}^{n+1}, b_{(n+1)(n+2)/2}^{n+1}\right), \text{ where } w_i^{n+1}, b_i^{n+1}$$

represent an $i^{th}$ hyper-plane normal vector and an $i^{th}$ hyper-plane intercept in the $(n+1)^{th}$ classification model, respectively;

(10) for the $(n+1)^{th}$ classification model $SVM_{n+1}$, testing an accuracy rate of the $(n+1)^{th}$ classification model $SVM_{n+1}$ using the test data set $$X_{TE} = \{X_1^{TE}, X_2^{TE}, \ldots, X_{N_{TE}}^{TE}\}$$

generated in step (2) and the labels $y_{TE}=[y_1, y_2, \ldots, y_{i_{TE}} \ldots, y_N]^T$ assigned in step (4), and calculating a classification accuracy rate $\varepsilon_R$ of the $(n+1)^{th}$ classification model $SVM_{n+1}$ using the method in step (6), where $N_{total}$ represents a total number of data points whose labels are 1 in $X_{TE}$, $N_{correct}$ represents a total number of data points in the test data set $X_{TE}$ whose labels are 1 and classified as category 1 by the classification model $SVM_1$, and when $$SVM_{n+1}(X_i) > 0 \text{ and } y_i^0 = 1,$$

the data point i is considered to be accurately classified; and

(11) configuring n=n+1, comparing $\varepsilon_R$ in step (10) with the equivalence model accuracy threshold $\varepsilon_D$, in case that $\varepsilon_R<\varepsilon_D$ and $n<n_{max}$, returning to step (8), and in case that $\varepsilon R_{\geq}\varepsilon_D$ or $n\geq n_{max}$, using the support vector machine $SVM_n$ as the equivalence model in the heating section of the electro-thermal coupled virtual power plant, and returning to step (2).

2. The method of claim 1, wherein the heat sources includes combined heat and power components, electric boilers and gas boilers.

3. The method of claim 1, wherein establishing the computing model for equivalent aggregation of the electro-thermal coupled virtual power plant comprises using:

(21) an objective function of the computing model for equivalent aggregation of the electro-thermal coupled virtual power plant:

$$\min_y \sum_{t\in\Upsilon}\left(c_t^{p,min}\underline{p}_t - c_t^{p,max}\overline{p}_t + c_t^{e,min}\underline{e}_t - c_t^{e,max}\overline{e}_t - c_t^{ru}r_t^u - c_t^{rd}r_t^d\right) + \max_{p_t^{order}\in\Omega}\min_x \sum_{t\in\Upsilon}[\sigma(\delta_t^+ + \delta_t^-)]$$

where the objective function is a maximum feasible domain of the computing model of equivalent aggregation of the electro-thermal coupled virtual power plant obtained by aggregation; parameters $$\underline{p}_t, \overline{p}_t, \underline{e}_t, \overline{e}_t, r_t^d \text{ and } r_t^u$$

represent a lower power limit, an upper power limit, a lower energy limit, an upper energy limit, a lower limit of a power change rate, and an upper limit of the power change rate of an interconnection line between the electro-thermal coupled virtual power plant and a superior power grid at the scheduling time t, respectively;

$$c_t^{p,min}, c_t^{p,max}, c_t^{e,min}, c_t^{e,max}, c_t^{ru} \text{ and } c_t^{rd}$$

represent weights of the parameters $$\underline{p}_t, \overline{p}_t, \underline{e}_t, \overline{e}_t, r_t^d \text{ and } r_t^u,$$

respectively; values of $$c_t^{p,min}, c_t^{p,max}, c_t^{e,min}, c_t^{e,max}, c_t^{ru} \text{ and } c_t^{rd}$$

are determined according to actual operation conditions of the superior power grid;

$$p_t^{order}$$

is an active power value of a possible scheduling plan of the superior power grid at the scheduling time t and is a variable to be solved;

$$\{\underline{p}_t, \overline{p}_t, \underline{e}_t, \overline{e}_t, r^u, r^d\}$$

represent variables to be calculated for solving an aggregation model of the electro-thermal coupled virtual power plant, these six variables constitute the feasible domain obtained by aggregation, and $$p_t^{order}$$

satisfies that $$\underline{p}_t \leq p_t^{order} \leq \overline{p}_t, t \in T, \underline{e}_t \leq \sum_{t=1}^{t} p_t^{order} \leq \overline{e}_t,$$
$$t \in T, \text{ and } -r^d \leq p_t^{order} - p_{t-1}^{order} \leq r^u, t \in T,$$

where σ represents a large positive number, such as $10^6$, $$\delta_t^+$$

represents an auxiliary variable for a power positive deviation of the interconnection line, $$\delta_t^-$$

represents an auxiliary variable for a power negative deviation of the interconnection line, y represents a first stage decision variable for an optimal computing model for equivalent aggregation of the electro-thermal coupled virtual power plant, X represents a second stage decision variable for the optimal computing model; a column vector consisting of the first stage decision variables y is $y=[\underline{p}_t, \overline{p}_t, \underline{e}_t, \overline{e}_t, r^u, r^d]$, and a column vector consisting of the second stage decision variables x is $$x = \left[p_t^{i_G}, p_t^{i_W}, p_t^{CHP,i_C}, h_t^{CHP i_C}, p_t^{c,i_E}, p_t^{dc,i_E}, e_t^{i_E}, h_t^{i_{GB}}, p_t^{i_{EB}}, \delta_t^+, \delta_t^-\right],$$

where $$p_t^{i_G}$$

represents a power output of an $i_G^{th}$ thermal generator in an electric section of the electro-thermal coupled virtual power plant at the scheduling time t, $$p_t^{W,i_W}$$

represents an actual power output of an $i_W^{th}$ new energy generator set in the electric section of the electro-thermal coupled virtual power plant at the scheduling time t, $$p_t^{CHP,i_C}$$

and $$h_t^{CHP,i_C}$$

represent an electricity output and a heat output of an $i_C^{th}$ combined heat and power component in a coupling section of the electro-thermal coupled virtual power plant at the scheduling time t, respectively;

$$p_t^{c,i_E} \text{ and } p_t^{dc,i_E}$$

represent a charging power and a discharging power of an $i_E^{th}$ battery in the electric section of the electro-thermal coupled virtual power plant at the scheduling time t, respectively;

$$e_t^{i_E}$$

represents an energy stored by the $i_E^{th}$ battery in the electric section of the electro-thermal coupled virtual power plant at the scheduling time t;

$$h_t^{i_{GB}}$$

represents a heating power of an $i_{GB}^{th}$ gas boiler in the heating section of the electro-thermal coupled virtual power plant at the scheduling time t, $$p_t^{i_{EB}}$$

represents a power consumption of an $i_{EB}^{th}$ electric boiler in the heating section of the electro-thermal coupled virtual power plant at the scheduling time t; and in the objective function, except for $$\delta_t^+, \delta_t^-,$$

the weights of other variables in the objective function are 0;

(22) constraints of the optimal computing model for equivalent aggregation of the electro-thermal coupled virtual power plant.

4. The method of claim 3, wherein the constraints comprise:

(221) constrains of the electric section:

$$p_t^{tie} + \sum_{i_G \in S_G} p_t^{i_G} + \sum_{i_W \in S_W} p_t^{i_W} + \sum_{i_C \in S_{CHP}} p_t^{i_C} + \sum_{i_E \in S_{ES}} \left(p_t^{dc,i_E} - p_t^{c,i_E}\right) = \sum_{i_B \in S_{BUS}} P_t^{L,i_B} + \sum_{i_{EB} \in S_{EB}} p_t^{i_{EB}}, \forall t \in \Upsilon$$

$$p_t^{l,BR} = \left| \sum_{n \in S_{BUS}} PTDF_{l,i_B} \cdot p_t^{NET,i_B} \right|, \forall l \in S_{BR}, t \in \Upsilon$$

$$p_t^{NET,n} = \sum_{i_G \in S_{G,i_B}} p_t^{i_G} + \sum_{i_W \in S_{W,i_B}} p_t^{i_W} + \sum_{i_C \in S_{CHP,i_B}} p_t^{i_C} + \sum_{i_E \in S_{ES,i_B}} \left(p_t^{dc,i_E} - p_t^{c,i_E}\right) - P_t^{L,n} - \sum_{i_{EB} \in S_{EB,n}} p_t^{i_{EB}}$$

$$e_1^{i_E} = E_0^{i_E} + \left(\eta^{c,i_E} p_1^{c,i_E} - p_1^{dc,i_E} / \eta^{dc,i_E}\right)\Delta t, \forall i_E \in S_{ES},$$

$$e_t^{i_E} = \left(1 - s^{i_E}\right)e_{t-1}^{i_E} + \left(\eta^{c,i_E} p_t^{c,i_E} - \frac{p_t^{dc,i_E}}{\eta^{dc,i_E}}\right)\Delta t, \forall t \in \Upsilon \backslash \{1\}, \forall i \in S_{ES}.$$

$$0 \le p_t^{i_W} \le P_t^{i_W,pre}$$

$$P_{min}^{i_G} \le p_t^{i_G} \le P_{max}^{i_G}$$

$$P_{min}^{i_{EB}} \le p_t^{i_{EB}} \le P_{max}^{i_{EB}}$$

where $S_G$, $S_W$, $S_{CHP}$, $S_{ES}$, $S_L$ and $S_{EB}$ represent a collection of thermal generators, a collection of new energy generator sets, a collection of combined heat and power components, a collection of batteries, a collection of electric loads, and a collection of electric boilers in the electro-thermal coupled virtual power plant, respectively; a subscript $i_B$ of device collection represents a collection of all devices connected to a node $i_B$ of a power distribution network in the electric section of the electro-thermal coupled virtual power plant; $S_{G,i_B}$ represents a collection of all thermal generators located at the node $i_B$; $S_{BUS}$ and $S_{BR}$ represent a collection of all nodes and a collection of all branches of the power distribution network in the electric section of the electro-thermal coupled virtual power plant, respectively; $S_{ES}$ represents a collection of all batteries in the electric section of the electro-thermal coupled virtual power plant;

$$P_t^{L,i_B}$$

represents an electric load power at the node $i_B$ at the scheduling time t; $PTDF_{l,i_B}$ represents a power transmission distribution factor of the node $i_B$ to a distribution network branch l, which is calculated by a direct current power flow equation in a power system network analysis technique;

$$p_t^{l,BR}$$

represents a power of 1,BR the distribution network branch l in the electric section of the electro-thermal coupled virtual power plant at the scheduling time t;

$$p_t^{NET,i_B}$$

represents a net outflow power of the node $i_B$ of the power distribution network in the electric section of the electro-thermal coupled virtual power plant at the scheduling time t; $\eta^{c,i_g}$ and $\eta^{dc,i_g}$ represent a charging efficiency and a discharging efficiency of the $i_E{}^{th}$ battery in the electric section of the electro-thermal coupled virtual power plant, respectively, $\Delta t$ represents an interval of scheduling times; $s^{i_g}$ represents a self-loss rate of the $i_E{}^{th}$ battery in the electric section of the electro-thermal coupled virtual power plant;

$$P_t^{i_W,pre}$$

represents a prediction power of the $i_W{}^{th}$ new energy generator set in the electric section of the electro-thermal coupled virtual power plant at the scheduling time t;

$$P_{max}^{i_G} \text{ and } P_{min}^{i_G}$$

represent a maximum active power and a minimum active power of the $i_G{}^{th}$ thermal generator in the electric section of the electro-thermal coupled virtual power plant, respectively; and $$P_{max}^{i_{EB}} \text{ and } P_{min}^{i_{EB}}$$

represent a maximum active power and a minimum active power of the $i_{EB}{}^{th}$ electric boiler in a coupling element of the electro-thermal coupled virtual power plant, respectively;

(222) constrains of the coupling element:

$$h_t^{i_{EB}} = \eta^{i_{EB}} p_t^{i_{EB}}, \forall i_{EB} \in S_{EB}$$

$$0 \le \lambda_t^{i_C,k} \le 1, \forall k \in EP^{i_C}, \forall t \in \Upsilon, \forall i_C \in S_{CHP}$$

$$\sum_{k \in EP^i} \lambda_t^{i_C,k} = 1, \forall t \in \Upsilon, \forall i_C \in S_{CHP}$$

$$p_t^{i_C} = \sum_{k \in EP^i C} \lambda_t^{i_C,k} P^{i_C,k}, h_t^{i_C} = \sum_{k \in EP^i C} \lambda_t^{i_C,k} H^{i_C,k}, \forall t \in \Upsilon, \forall i_C \in S_{CHP}$$

$$H_{min}^{i_{GB}} \le h_t^{i_{GB}} \le H_{max}^{i_{GB}}$$

where $\eta^{i_{EB}}$ represents an efficiency of the $i_{EB}{}^{th}$ electric boiler in the coupling element of the electro-thermal coupled virtual power plant;

$$h_t^{i_{EB}}$$

represents a thermal output power of the $i_{EB}{}^{th}$ electric boiler at the scheduling time t; $EP^{i_c}$ represents a collection of all poles of the feasible domain of the $i_C{}^{th}$ combined heat and power component;

$$\lambda_t^{i_C,k}$$

represents a scale factor of a pole k of the $i_C{}^{th}$ combined heat and power component; $P^{i_C,k}$ and $H^{i_C,k}$ represent an electrical power and a thermal power corresponding to the pole k of the $i_C{}^{th}$ combined heat and power component, respectively;

$$H_{max}^{i_{GB}} \text{ and } H_{min}^{i_{GB}}$$

represent a maximum thermal power and a minimum thermal power of the $i_{GB}{}^{th}$ gas boiler, respectively;

(223) constraints of the heating section after data-driven equivalence:

determining the equivalence model in the heating section of the electro-thermal coupled virtual power plant as the constraints of the heating section after data-driven equivalence by $$SVM_n(h_t^1, h_t^2, \ldots, h_t^{NHS}, \tau_t) = 0$$

where a superscript NHS represents a total number of heat sources in the heating section of the electro-thermal coupled virtual power plant;

$$h_{i_d,t}^j$$

represents a thermal output power of a $j^{th}$ heat source in the heating section in an $i_d{}^{th}$ data at the scheduling time t, and $\tau_{i_d,t}$ represents the outdoor temperature in the $i_d{}^{th}$ data at the scheduling time t.

5. The method of claim 4, wherein a value of $\eta^{c,i_g}$ is 0.95, and a value of $\eta^{dc,i_g}$ is 0.95.

6. The method of claim 4, wherein a value of $s^{i_E}$ is 0.999.

7. The method of claim 4, wherein the combined heat and power component is a back-pressure combined heat and power component, and the number of poles in a feasible domain is 2.

8. The method of claim 4, wherein the combined heat and power component is a pumped condensing combined heat and power component, and the number of poles in a feasible domain is 3 or 4.

9. The method of claim 1, wherein realizing equivalent aggregation of the electro-thermal coupled virtual power plant by solving the computing model for equivalent aggregation of the electro-thermal coupled virtual power plant comprises:

realizing equivalent aggregation of the electro-thermal coupled virtual power plant by solving an optimal computing model for equivalent aggregation of the electro-thermal coupled virtual power plant by a column-and-constraint generation method, and obtaining optimal values of $\underline{p}_t$, $\overline{p}_t$, $\underline{e}_t$, $\overline{e}_t$, $r^d$ and $r^u$ as final values of a lower power limit, an upper power limit, a lower energy limit, an upper energy limit, a lower limit of power change rate, and an upper limit of power change rate of an interconnection line between the electro-thermal coupled virtual power plant and a superior power grid.

10. An electronic device, comprising:

a memory, configured to store instructions executable by a computer;

a processor, configured to:

obtain an equivalence model in a heating section of an electro-thermal coupled virtual power plant by training a support vector machine;

establish a computing model for equivalent aggregation of the electro-thermal coupled virtual power plant; and realize equivalent aggregation of the electro-thermal coupled virtual power plant by solving the computing model for equivalent aggregation of the electro-thermal coupled virtual power plant;

wherein the processor is configured to:

(1) based on historical operation data of the heating section of the electro-thermal coupled virtual power plant or using a heating section simulation model built using a simulation model, obtain N operation data, establish an operation data set $X=\{X_1, X_2, \ldots, X_N\}$, wherein $\{X_{i_d}|1\le i_d\le N\}$, $X_1, X_2, \ldots, X_N$, determine heating powers and outdoor temperatures of all heat sources in the heating section at all times from the operation data set X as features, wherein a subscript id represents an operation data serial number, $i_d=1, 2, \ldots, N$, $$X_{i_d} = [h_{i_d,t}^1, h_{i_d,t}^2, \ldots, h_{i_d,t}^{NHS}, \tau_{i_d,t}]^T, t \in T,$$

a superscript T represents a matrix transposition, NHS represents a total number of heat sources in the heating section of the electro-thermal coupled virtual power plant, $$h_{i_d,t}^j$$

represents a thermal output power of a $j^{th}$ heat source in the heating section in the $i_d{}^{th}$ operation data at a scheduling time t, $\tau_{i_d,t}$ represents an outdoor temperature in the $i_d{}^{th}$ operation data at the scheduling time t;

(2) obtain $N_{TE}$ operation data from the historical operation data of the heating section of the electro-thermal coupled virtual power plant or the heating section simulation model built using the simulation model, establish a test data set $$X_{TE} = \{X_1^{TE}, X_2^{TE}, \ldots, X_{N_{TE}}^{TE}\}$$

by using the $N_{TE}$ operation data as test data, determine heating powers and outdoor temperatures of all heat sources in the heating section at all times from the test data set $X_{TE}$ as features;

(3) assign initial labels $y^0=[y_1, y_2, \ldots, y_{i_d} \ldots, y_N]^T$ to each data in the operation data set X in step (1), wherein the subscript $i_d$ represents the operation data serial number, $i_d=1, 2, \ldots, N$, $y_{i_d}$ represents a label corresponding to the $i_d^{th}$ operation data, and the superscript T represents the matrix transposition; judging a temperature inside all heat load chambers in the heating section of the electro-thermal coupled virtual power plant under conditions of the operation data set, in case that the temperature inside all the heat load chambers reaches a temperature threshold under operation conditions corresponding to the $i_d^{th}$ operation data $X_{i_d}$, assigning label 0 to the $i_d^{th}$ operation data by $y_{i_d}=0$, and in case that the temperature inside at least one heat load chamber in the electro-thermal coupled virtual power plant does not reach the temperature threshold, assigning label 1 to the $i_d^{th}$ operation data by $y_{i_d}=1$;

(4) assign labels $y_{TE}=[y_1, y_2, \ldots, y_{i_{TE}} \ldots, y_N]^T$ to the test data set generated in step (2), wherein a subscript TE represents a test data serial number, $i_{TE}=1, 2, \ldots, N_{TE}$, and a superscript T represents the matrix transposition; and judging a temperature inside heat load chambers in the heating section under operation conditions of the test data set, in case that the temperature inside all the heat load chambers reaches the temperature threshold under operation conditions corresponding to the $i_{TE}^{th}$ test data, assigning label 0 to the $i_{TE}^{th}$ test data, and in case that the temperature inside at least one heat load chamber in the electro-thermal coupled virtual power plant does not reach the temperature threshold, assigning label 1 to the $i_{TE}^{th}$ test data;

(5) set an equivalence model accuracy threshold $\varepsilon_D$ and a maximum training number $n_{max}$, and perform single classification training on the operation data set X in step (1) comprising:

setting a total training number n=1, inputting the operation data set X to the support vector machine $SVM_1$, outputting classification results for each data in the operation data set X by the support vector machine $SVM_1$, and obtaining a classification model $SVM_1=(w_1, b_1)$, where $w_1$ represents a hyper-plane normal vector of the classification model in the support vector machine, and $b_1$ represents a hyper-plane intercept of the classification model in the support vector machine;

(6) use the test data set $$X_{TE}=\{X_1^{TE}, X_2^{TE}, \ldots, X_{N_{TE}}^{TE}\}$$

generated in step (2) and the labels $$y_{TE}=[y_1, y_2, \ldots, y_{i_{TE}} \ldots, y_N]^T$$

assigned in step (4), calculating a classification accuracy rate $\varepsilon_R$ of the support vector machine $SVM_1=(w_1, b_1)$ when n=1 by a following formula:

$$\varepsilon_R=\frac{N_{correct}}{N_{total}}\times 100\%,$$

where $N_{total}$ is a total number of data points in the test data set $X_{TE}$ whose labels are 1, $N_{correct}$ is a number of samples correctly classified, and $N_{correct}$ is a total number of data points in the test data set $X_{TE}$ whose labels are 1 and classified as category 1 by the classification model $SVM_1$;

(7) compare the $\varepsilon_R$ with the equivalence model accuracy threshold $\varepsilon_D$, in case that $\varepsilon_R<\varepsilon_D$ and $n<n_{max}$, executing step (8), and in case that $\varepsilon_R\geq\varepsilon_D$ or $n\geq n_{max}$, using a support vector machine $SVM_n$ as the equivalence model in the heating section of the electro-thermal coupled virtual power plant, and executing step (2);

(8) add the n in step (5) by 1 and reassign labels $$y^n=\{y_1^n, y_2^n, \ldots, y_N^n\}$$

to the operation data set X in step (1), where $$y_{i_d}^n=\begin{cases} y_{i_d}^{n-1}, & i_d\notin S_{wrong} \\ \max\{y_{i_d}^{n-1}\}+1, & i_d\in S_{wrong} \end{cases},$$

$S_{wrong}$ represents a set consisting of serial numbers of the samples classified incorrectly in step (6), $$S_{wrong}=\{i|y_i^0=1, SVM_n(X_i)<1\},$$

$i_d$ represents the data serial number of the operation data set;

(9) classify the operation data set X in step (1) and the labels $y^n$ in step (8), to obtain an $(n+1)^{th}$ classification model $$SVM_{n+1}=(w_1^{n+1}, b_1^{n+1}, \ldots, w_{(n+1)(n+2)/2}^{n+1}, b_{(n+1)(n+2)/2}^{n+1}), \text{ where } w_i^{n+1}, b_i^{n+1}$$

represent an $i^{th}$ hyper-plane normal vector and an $i^{th}$ hyper-plane intercept in the $(n+1)^{th}$ classification model, respectively;

(10) for the $(n+1)^{th}$ classification model $SVM_{n+1}$, test an accuracy rate of the $(n+1)^{th}$ classification model $SVM_{n+1}$ using the test data set $$X_{TE}=\{X_1^{TE}, X_2^{TE}, \ldots, X_{N_{TE}}^{TE}\}$$

generated in step (2) and the labels $y_{TE}=[y_1, y_2, \ldots, y_{i_{TE}} \ldots, y_N]^T$ assigned in step (4), and calculate a classification accuracy rate $\varepsilon_R$ of the $(n+1)^{th}$ classification model $SVM_{n+1}$ using the method in step (6), where $N_{total}$ represents a total number of data points whose labels are 1 in $X_{TE}$, $N_{correct}$ represents a total number of data points in the test data set $X_{TE}$ whose labels are 1 and classified as category 1 by the classification model $SVM_1$, and when $SVM_{n+1}(X_i)>0$ and $$y_i^0 = 1,$$

the data point i is considered to be accurately classified; and

(11) configure n=n+1, comparing $\varepsilon_R$ in step (10) with the equivalence model accuracy threshold $\varepsilon_D$, in case that $\varepsilon_R<\varepsilon_D$ and $n<n_{max}$, returning to step (8), and in case that $\varepsilon_R\geq\varepsilon_D$ or $n\geq n_{max}$, using the support vector machine $SVM_n$ as the equivalence model in the heating section of the electro-thermal coupled virtual power plant, and returning to step (2).

11. The electronic device of claim 10, wherein the processor is configured to use:

(21) an objective function of the computing model for equivalent aggregation of the electro-thermal coupled virtual power plant:

$$\min_y \sum_{t\in\Upsilon}\left(c_t^{p,min}\underline{p}_t - c_t^{p,max}\overline{p}_t + c_t^{e,min}\underline{e}_t - c_t^{e,max}\overline{e}_t - c_t^{ru}r_t^u - c_t^{rd}r_t^d\right) + \max_{p_t^{order}\in\Omega}\min_x \sum_{t\in\Upsilon}[\sigma(\delta_t^+ + \delta_t^-)]$$

where the objective function is a maximum feasible domain of the computing model of equivalent aggregation of the electro-thermal coupled virtual power plant obtained by aggregation; parameters $\underline{p}_t$, $\overline{p}_t$, $\underline{e}_t$, $\overline{e}^t$, $$r_t^d \text{ and } r_t^u$$

represent a lower power limit, an upper power limit, a lower energy limit, an upper energy limit, a lower limit of a power change rate, and an upper limit of the power change rate of an interconnection line between the electro-thermal coupled virtual power plant and a superior power grid at the scheduling time t, respectively;

$$c_t^{p,min},\ c_t^{p,max},\ c_t^{e,min},\ c_t^{e,max},\ c_t^{ru} \text{ and } c_t^{rd}$$

represent weights of the parameters $\underline{p}_t$, $\overline{p}_t$, $\underline{e}_t$, $\overline{e}_t$, $$r_t^d \text{ and } r_t^u,$$

respectively; values of $$c_t^{p,min},\ c_t^{p,max},\ c_t^{e,min},\ c_t^{e,max},\ c_t^{ru} \text{ and } c_t^{rd}$$

are determined according to actual operation conditions of the superior power grid;

$$p_t^{order}$$

is an active power value of a possible scheduling plan of the superior power grid at the scheduling time t and is a variable to be solved; $\{\underline{p}_t, \overline{p}_t, \underline{e}_t, \overline{e}_t, r^u, r^d\}$ represent variables to be calculated for solving an aggregation model of the electro-thermal coupled virtual power plant, these six variables constitute the feasible domain obtained by aggregation, and $$p_t^{order}$$

satisfies that $$\underline{p}_t \leq p_t^{order} \leq \overline{p}_t,\ t\in T,\ \underline{e}_t \leq \sum_{t=1}^{t} p_t^{order} \leq \overline{e}_t,\ t\in T, \text{ and } -r^d \leq p_t^{order} - p_{t-1}^{order} \leq r^u,\ t\in T,$$

where $\sigma$ represents a positive number, $$\delta_t^+$$

represents an auxiliary variable for a power positive deviation of the interconnection line, $$\delta_t^-$$

represents an auxiliary variable for a power negative deviation of the interconnection line, y represents a first stage decision variable for an optimal computing model for equivalent aggregation of the electro-thermal coupled virtual power plant, x represents a second stage decision variable for the optimal computing model; a column vector consisting of the first stage decision variables y is $y=[\underline{p}_t, \overline{p}_t, \underline{e}_t, \overline{e}_t, r^u, r^d]$, and a column vector consisting of the second stage decision variables x is $$x = \left[p_t^{i_G}, p_t^{i_W}, p_t^{CHP,i_C}, h_t^{CHP,i_C}, p_t^{c,i_E}, p_t^{dc,i_E}, e_t^{i_E}, h_t^{i_{GB}}, p_t^{i_{EB}}, \delta_t^+, \delta_t^-\right],$$

where $$p_t^{i_G}$$

represents a power output of an $i_G{}^{th}$ thermal generator in an electric section of the electro-thermal coupled virtual power plant at the scheduling time t, $$p_t^{W,i_W}$$

represents an actual power output of an $i_W{}^{th}$ new energy generator set in the electric section of the electro-thermal coupled virtual power plant at the scheduling time t, $$p_t^{CHP,i_C}$$

and $$h_t^{CHP,i_C}$$

represent an electricity output and a heat output of an $i_C{}^{th}$ combined heat and power component in a coupling section of the electro-thermal coupled virtual power plant at the scheduling time t, respectively;

$$p_t^{c,i_E} \text{ and } p_t^{dc,i_E}$$

represent a charging power and a discharging power of an $i_E{}^{th}$ battery in the electric section of the electro-thermal coupled virtual power plant at the scheduling time t, respectively;

$$e_t^{i_E}$$

represents an energy stored by the $i_E{}^{th}$ battery in the electric section of the electro-thermal coupled virtual power plant at the scheduling time t;

$$h_t^{i_{GB}}$$

represents a heating power of an $i_{GB}{}^{th}$ gas boiler in the heating section of the electro-thermal coupled virtual power plant at the scheduling time t, $$p_t^{i_{EB}}$$

represents a power consumption of an $i_{EB}{}^{th}$ electric boiler in the heating section of the electro-thermal coupled virtual power plant at the scheduling time t; and in the objective function, except for $$\delta_t^+, \delta_t^-,$$

the weights of other variables in the objective function are 0;

(22) constraints of the optimal computing model for equivalent aggregation of the electro-thermal coupled virtual power plant.

12. The electronic device of claim 10, wherein the processor is configured to:

realize equivalent aggregation of the electro-thermal coupled virtual power plant by solving an optimal computing model for equivalent aggregation of the electro-thermal coupled virtual power plant by a column-and-constraint generation method, and obtain optimal values of $\underline{p}_t$, $\overline{p}_t$, $\underline{e}_t$, $\overline{e}_t$, $r^d$ and $r^u$ as final values of a lower power limit, an upper power limit, a lower energy limit, an upper energy limit, a lower limit of power change rate, and an upper limit of power change rate of an interconnection line between the electro-thermal coupled virtual power plant and a superior power grid.

13. A non-transitory computer-readable storage medium having computer programs stored thereon, wherein the computer programs are configured to cause a computer to:

obtain an equivalence model in a heating section of an electro-thermal coupled virtual power plant by training a support vector machine;

establish a computing model for equivalent aggregation of the electro-thermal coupled virtual power plant; and realize equivalent aggregation of the electro-thermal coupled virtual power plant by solving the computing model for equivalent aggregation of the electro-thermal coupled virtual power plant;

wherein the computer programs are further configured to:

(1) based on historical operation data of the heating section of the electro-thermal coupled virtual power plant or using a heating section simulation model built using a simulation model, obtaining N operation data, establishing an operation data set $X=\{X_1, X_2, \ldots, X_N\}$, wherein $\{X_{i_d}|1\le i_d\le N\}$, $X_1, X_2, \ldots, X_N$, determining heating powers and outdoor temperatures of all heat sources in the heating section at all times from the operation data set X as features, wherein a subscript $i_d$ represents an operation data serial number, $i_d=1, 2, \ldots, N$, $$X_{i_d} = \left[h_{i_d,t}^1, h_{i_d,t}^2, \ldots, h_{i_d,t}^{NHS}, \tau_{i_d,t}\right]^T, t \in T,$$

a superscript T represents a matrix transposition, NHS represents a total number of heat sources in the heating section of the electro-thermal coupled virtual power plant, $$h_{i_d,t}^j$$

represents a thermal output power of a $j^{th}$ heat source in the heating section in the $i_d{}^{th}$ operation data at a scheduling time t, $\tau_{i_d,t}$ represents an outdoor temperature in the $i_d{}^{th}$ operation data at the scheduling time t;

(2) obtaining $N_{TE}$ operation data from the historical operation data of the heating section of the electro-thermal coupled virtual power plant or the heating section simulation model built using the simulation model, establishing a test data set $$X_{TE} = \left\{X_1^{TE}, X_2^{TE}, \ldots, X_{N_{TE}}^{TE}\right\}$$

by using the $N_{TE}$ operation data as test data, determining heating powers and outdoor temperatures of all heat sources in the heating section at all times from the test data set $X_{TE}$ as features;

(3) assigning initial labels $y^0=[y_1, y_2, \ldots, y_{i_d} \ldots, y_N]^T$ to each data in the operation data set X in step (1), wherein the subscript $i_d$ represents the operation data serial number, $i_d=1, 2, \ldots, N$, $y_{i_d}$ represents a label corresponding to the $i_d^{th}$ operation data, and the superscript T represents the matrix transposition; judging a temperature inside all heat load chambers in the heating section of the electro-thermal coupled virtual power plant under conditions of the operation data set, in case that the temperature inside all the heat load chambers reaches a temperature threshold under operation conditions corresponding to the $i_d^{th}$ operation data $X_{i_d}$, assigning label 0 to the $i_d^{th}$ operation data by $y_{i_d}=0$, and in case that the temperature inside at least one heat load chamber in the electro-thermal coupled virtual power plant does not reach the temperature threshold, assigning label 1 to the $i_d^{th}$ operation data by $y_{i_d}=1$;

(4) assigning labels $y=[y_1, y_2, \ldots, y_{i_{TE}} \ldots, y_N]^T$ to the test data set generated in step (2), wherein a subscript TE represents a test data serial number, $i_{TE}=1, 2, \ldots, N_{TE}$, and a superscript T represents the matrix transposition; and judging a temperature inside heat load chambers in the heating section under operation conditions of the test data set, in case that the temperature inside all the heat load chambers reaches the temperature threshold under operation conditions corresponding to the $i_{TE}^{th}$ test data, assigning label 0 to the $i_{TE}^{th}$ test data, and in case that the temperature inside at least one heat load chamber in the electro-thermal coupled virtual power plant does not reach the temperature threshold, assigning label 1 to the $i_{TE}^{th}$ test data;

(5) setting an equivalence model accuracy threshold $\varepsilon_D$ and a maximum training number nmax, and performing single classification training on the operation data set X in step (1) comprising:

setting a total training number n=1, inputting the operation data set X to the support vector machine $SVM_1$, outputting classification results for each data in the operation data set X by the support vector machine $SVM_1$, and obtaining a classification model $SVM_1=(w_1, b_1)$, where $w_1$ represents a hyper-plane normal vector of the classification model in the support vector machine, and $b_1$ represents a hyper-plane intercept of the classification model in the support vector machine;

(6) using the test data set $$X_{TE} = \{X_1^{TE}, X_2^{TE}, \ldots, X_{N_{TE}}^{TE}\}$$

generated in step (2) and the labels $y_{TE}=[y_1, y_2, \ldots, y_{i_{TE}} \ldots, y_N]^T$ assigned in step (4), calculating a classification accuracy rate $\varepsilon_R$ of the support vector machine $SVM_1=(w_1, b_1)$ when n=1 by a following formula:

$$\varepsilon_R = \frac{N_{correct}}{N_{total}} \times 100\%,$$

where $N_{total}$ is a total number of data points in the test data set $X_{TE}$ whose labels are 1, $N_{correct}$ is a number of samples correctly classified, and $N_{correct}$ is a total number of data points in the test data set $X_{TE}$ whose labels are 1 and classified as category 1 by the classification model $SVM_1$;

(7) comparing the $\varepsilon_R$ with the equivalence model accuracy threshold $\varepsilon_D$, in case that $\varepsilon_R<\varepsilon_D$ and $n<n_{max}$, executing step (8), and in case that $\varepsilon_R\geq\varepsilon_D$ or $n\geq n_{max}$, using a support vector machine $SVM_n$ as the equivalence model in the heating section of the electro-thermal coupled virtual power plant, and executing step (2);

(8) adding the n in step (5) by 1 and reassign labels $$y^n = \{y_1^n, y_2^n, \ldots, y_N^n\}.$$

to the operation data set X in step (1), where $$y_{i_d}^n = \begin{cases} y_{i_d}^{n-1}, & i_d \notin S_{wrong} \\ \max\{y_{i_d}^{n-1}\} + 1, & i_d \notin S_{wrong} \end{cases},$$

$S_{wrong}$ represents a set consisting of serial numbers of the samples classified incorrectly in step (6), $$S_{wrong} = \{i \mid y_i^0 = 1, SVM_n(X_i) < 1\},$$

$i_d$ represents the data serial number of wrong the operation data set;

(9) classifying the operation data set X in step (1) and the labels $y^n$ in step (8), to obtain an $(n+1)^{th}$ classification model $$SVM_{n+1} = \left(w_1^{n+1}, b_1^{n+1}, \ldots, w_{(n+1)(n+2)/2}^{n+1}, b_{(n+1)(n+2)/2}^{n+1}\right),$$

where $$w_i^{n+1}, b_i^{n+1}$$

represent an $i^{th}$ hyper-plane normal vector and an ith hyper-plane intercept in the $(n+1)^{th}$ classification model, respectively;

(10) for the $(n+1)^{th}$ classification model $SVM_{n+1}$, testing an accuracy rate of the $(n+1)^{th}$ classification model $SVM_{n+1}$ using the test data set $$X_{TE} = \{X_1^{TE}, X_2^{TE}, \ldots, X_{N_{TE}}^{TE}\}$$

generated in step (2) and the labels $y_{TE}=[y_1, y_2, \ldots, y_{i_{TE}} \ldots, y_N]^T$ assigned in step (4), and calculating a classification accuracy rate $\varepsilon_R$ of the $(n+1)^{th}$ classification model $SVM_{n+1}$ using the method in step (6), where $N_{total}$ represents a total number of data points whose labels are 1 in $X_{TE}$, $N_{correct}$ represents a total number of data points in the test data set $X_{TE}$ whose labels are 1 and classified as category 1 by the classification model $SVM_1$, and when $$SVM_{n+1}(X_i) > 0 \text{ and } y_i^0 = 1,$$

the data point i is considered to be accurately classified; and

(11) configuring n=n+1, comparing $\varepsilon_R$ in step (10) with the equivalence model accuracy threshold $\varepsilon_D$, in case that $\varepsilon_R<\varepsilon_D$ and $n<n_{max}$, returning to step (8), and in case that $\varepsilon_R \geq \varepsilon_D$ or $n \geq n_{max}$, using the support vector machine $SVM_n$ as the equivalence model in the heating section of the electro-thermal coupled virtual power plant, and returning to step (2).

* * * * *